(12) United States Patent
Harles et al.

(10) Patent No.: US 6,934,314 B2
(45) Date of Patent: *Aug. 23, 2005

(54) METHOD AND APPARATUS FOR DETERMINING CHARACTERISTICS OF COMPONENTS OF A COMMUNICATION CHANNEL

(75) Inventors: Guy Harles, Fentange (LU); Gerhard Bethscheider, Ayl (DE)

(73) Assignee: SES Astra S.A., Betzdorf (LU)

( * ) Notice: Subject to any disclaimer, the term of this patent is extended or adjusted under 35 U.S.C. 154(b) by 450 days.

This patent is subject to a terminal disclaimer.

(21) Appl. No.: 10/021,376

(22) Filed: Dec. 6, 2001

(65) Prior Publication Data

US 2002/0094015 A1 Jul. 18, 2002

Related U.S. Application Data

(63) Continuation of application No. PCT/EP99/04241, filed on Jun. 18, 1999.

(51) Int. Cl.[7] .................................................. H04B 1/69
(52) U.S. Cl. ......................... 375/130; 375/145; 455/17
(58) Field of Search ................................ 375/130, 145; 455/17

(56) References Cited

U.S. PATENT DOCUMENTS 4,637,017 A    1/1987  Assal et al.
5,546,421 A    8/1996  Basile et al.
5,799,005 A    8/1998  Soliman
6,275,678 B1 * 8/2001  Bethscheider et al. ......... 455/17
6,535,546 B1 * 3/2003  Bethscheider et al. ...... 375/145

FOREIGN PATENT DOCUMENTS

DE          3644175        7/1988
WO      WO 99/33203        7/1999
WO      WO 99/33204        7/1999

* cited by examiner

*Primary Examiner*—Stephen Chin
*Assistant Examiner*—Sudhanshu C. Pathak
(74) *Attorney, Agent, or Firm*—Wolf, Greenfield & Sacks, P.C.

(57) ABSTRACT

The invention refers to a method and an apparatus for determining characteristics of components of a communication channel. In order to simplify the intersystem coordination in a beginning of life test of a satellite communication channel and avoiding the interference of adjacent satellite systems the method according to the invention comprises the following steps: modulating a clean carrier signal f(t) by spread spectrum modulation to generate a spreaded clean carrier signal s(t); transmitting said spreaded clean carrier signal s(t) through said communication channel at a first predetermined level; receiving a receive signal s'(t) corresponding to said spreaded clean carrier signal s(t) after having traveled through said communication channel; demodulating said receive signal s'(t) by spread spectrum demodulation to generate a despreaded carrier signal f'(t); determining characteristics of components of the communication channel on the basis of a comparison of said clean carrier signal f(t) and said despreaded carrier signal f'(t).

6 Claims, 5 Drawing Sheets

METHOD AND APPARATUS FOR DETERMINING CHARACTERISTICS OF COMPONENTS OF A COMMUNICATION CHANNEL

CROSS REFERENCE TO RELATED APPLICATION

This application is a Continuation of prior application No: PCT/EP99/04241 filed on Jun. 18, 1999, entitled Method and Apparatus for Determining Characteristics of Components of a Communication Channel, and now pending.

FIELD OF THE INVENTION

This invention refers to a method for determining characteristics of components of a communication channel and in particular of a satellite communication channel.

BACKGROUND OF THE INVENTION

After a successful launch of a new communications satellite, it is essential to test the communication's subsystem while a spacecraft is in orbit so as to compare with prelaunch data in order to ensure that no impairment has resulted from the stress of the launch and to verify that the spacecraft payload is compliant with the specification sought.

As to the in-orbit test technology it has to be considered that the spacecraft has to be operational very quickly while not sacrifying the number of tests that have to be performed. Thus, microwave measurement techniques with more powerful computers and software technology have been used to automate the beginning of life test of a new communications satellite.

In order to give an understanding of the tests which have to be performed, it has to be noted that a communication channel is in general separated in adjacent channels with the help of adequate filters. The channel filters fulfill two distinctive tasks: in first place, the specific channel filters have to avoid an interference from and to adjacent channels, and secondly, the signal passing the channel must not be subject to distortion due to filter characteristics.

In the following, a satellite transponder as a communication channel is described more in detail with regard to FIG. 1.

A transponder of a communication satellite comprises a receiving antenna 1 for receiving an uplink signal sent from a ground station (not shown). An output signal of said receiving antenna 1 is fed to an input demultiplexer (IMUX) 3 after frequency conversion in frequency converter 2. Said input demultiplexer 3 comprises several first filters 4-1 to 4-n for separating individual signals within the signal from the antenna. Typically, one filter is provided for each signal to be separated from the other signals received via said receiving antenna 1 and corresponds to a communication channel. The n output signals of said input demultiplexer 3 are fed to a corresponding number of high power amplifiers 5-1 to 5-n in each of which a traveling wave tube (TWT) is employed for amplifying the output signals of said input demultiplexer 3. As each of said high power amplifiers is normally operated in its saturation point, multiple signals would create intermodulation products and distortion of the signals. The amplifier output signals are passed through second filters 6-1 to 6-n which are part of an output multiplexer (OMUX) 7 combining the n amplifier output signals. The output signal of said output multiplexer 7 is fed to a transmitting antenna 8 for being transmitted to the desired area on the ground.

Hence, the demultiplexer (IMUX) consists of one filter per channel which separates the wanted signal from all other incoming signals. This separation is necessary in order to avoid multiple signals to reach the respective high power amplifier. Each channel has its own assigned high power amplifier (generally a traveling wave tube amplifier). As these high power amplifiers are normally operated in their saturation point, multiple signals would create intermodulation products, and thus distort the signals at the output of the satellites transmit antenna (down-link).

After the amplification, the signals are passed through a second filter (at the output multiplexer OMUX filter) which should avoid the broadband noise of the amplifiers to interfere with adjacent channels. Before being transmitted via the satellite's transmit antenna, all signals are combined again in the output multiplexer (OMUX).

The transponder filter characteristics are thus mainly determined by the IMUX and OMUX filters, which are in general realized in waveguide technology. Prior to launching a satellite, the filters are designed and tested according to specifications. After the launch, the entire satellite, including the payload and especially the filters have to be tested in order to verify if during the launch phase, filters have been damaged. The beginning of life tests are is thus a very crucial part before the operational life of a satellite.

For the beginning of life tests, the satellite is in general placed at an orbital position, which is not the final destination of the satellite. The reason for this is for instance that if the satellite contains transponders (backup) which may interfere with operational transponders, the measurement signal on the satellite under test may create interference to payload signals of the operational satellites.

The orbital position on which a new satellite is placed during beginning of life tests is in general coordinated in such a way that no interference is created to any operational system. However, as the geostationary arc is more and more crowded with Ku-band satellites, it becomes more and more difficult to identify a slot, in which all bands of the satellite under test may be measured with high power signals.

Hence, when planning in-orbit tests on a communication satellite, a major constraint is to ensure that no radio interference can be generated, disturbing other communications satellite systems sharing the same frequency bands and, conversely, that the results of the satellite under in-orbit testing are not jeopardized by transmissions associated with other systems.

From the publication in International Journal of Satellite Communications, Vol. 13, 403–412 (1995); C. Moens and F. Absolonne: "ESA's in-orbit test facilities for communications satellites" those aspects were analyzed by a in-orbit test plan to cope with the following situations of the "maritime satellite based on the European communication satellite system bus"—program:

(1) The presence of other maritime satellites resulted in non-permissible frequency slots in which it was not allowed to generate a carrier from the ground or from the satellite is payload, e.g. the TDMA access channel and the search and rescue frequency band. This was accommodated in the software of the in-orbit testing computer by creating a frequency plan which inhibited use of the non-permissible frequency slots, such that test signals can only be generated in the permitted frequency channels.

(2) The second problem was created by the forward transponder containing an automatic level control function which keeps the output power constant irrespective of the transponder loading. The consequence is that the transmitted noise power increases, as transponder loading decreases, to reach an unacceptable level (from the interference point of view) when the transponder is not loaded. This difficulty has been overcome by ensuring a permanent minimum loading of the forward transponder. The loading was created by automatically up-linking two carriers, generated by dedicated synthesizers, during the inactive periods of the payload commissioning and acceptance phases. In the case of a malfunction in the C-band up-link during any in-orbit test, the minimum loading violation was detected by a specific computer program activating the loading carriers and aborting the ongoing test. The last result was for the European Space Operations Center to switch off the satellite payload.

Hence, according to conventional techniques the characteristics as amplitude response and group delay of the IMUX and OMUX filters is performed with a microwave link analyzer, which uses a frequency modulated carrier to measure amplitude response and group delay. The microwave link analyzer determines the group delay at a specific frequency by differentiating of the phase delay over frequency. As in a channel using a high power amplifier like a TWTA, the amplitude to phase modulation (AM/PM) conversion can lead to erroneous measurements, the power of the MLA signal has to be far below the saturation point.

U.S. Pat. No. 5,546,421 discloses a self-compensating spread spectrum hybrid which is used in a communication station coupled to a bi-directional input-output signal path. Such a communication station could be e.g. a simple terminal equipment of a telephone line. A hybrid circuit is defined as a multi-port component that roots an incoming signal to a neighbouring port without influencing the other ports. This property is called "directivity", wherein the quality of the directivity is characterized by the "isolation". The maximum isolation is achieved when the bi-directional signal transmission path presents an impedance to be bi-directional signal port of the hybrid which matches the impedance for which the hybrid is designed. U.S. Pat. No. 5,546,421 identifies the problem that the impedance presented by the bi-directional signal path to the hybrid may change dynamically during operation. As a solution it is suggested that the impedance of the bi-directional line is measured by a $S_{11}$-measurement using a spread spectrum technique. The spread spectrum pilot signal covers the bandwidth of the information signal, and is reflected in an amount and with a phase which depends upon the relative impedance presented to the hybrid by the bi-directional signal path. The receive signal, which arrives at the station bi-directional port from the bi-directional path, is coupled from the hybrid to a spread spectrum demodulator, which regenerates the own station pilot signal with a phase which depends upon the impedance presented by the bi-directional signal path to the hybrid. The pilot signal is phase-detected, processed and applied to the hybrid to minimize the amount of transmit signal coupled to the receive board in a closed-loop operation.

U.S. Pat. No. 4,637,017 discloses a method of measuring input-back off to an amplifier in an time-division multiple access (TDMA) communication system having a carrier recovery segment and a clock recovery segment prior to a data segment in traffic burst. A monitoring station transmits a CW pilot signal within the amplifier's bandwidth. In the guard time between bursts, the monitoring station measures the unsuppressed pilot level output by the amplifier. While a ground station is transmitting an unmodulated carrier during carrier recovery or a carrier modulated at the clock frequency during clock recovery, the monitoring station measures the suppressed pilot signal. The amount of pilot suppression is related to the input power back off of the carrier by a previously measured or a theoretically derived relationship. The carrier-to-suppressed noise ratio is determined by measuring the carrier level during the carrier recovery and by measuring the suppressed noise during carrier or clock recovery during a noise filter centered away from any transmitted signals or their intermodulation products.

After a successful launch of a new communications satellite, various satellite subsystems have to be tested and their performance has to be evaluated. The most important drawback of the conventional testing techniques is that the measurement signal can create interference to an adjacent satellite system. On the other hand, the measurement signal itself is subject to noise and interference created by signals coming from adjacent satellites. This situation is explained in more detail below according to FIG. 5.

SUMMARY OF THE INVENTION

It is an object of the invention to simplify the intersystem coordination in a beginning of life test and to avoid the interference of adjacent satellite systems.

This object is solved by the features of a method according to claim 1 and an apparatus according to claim 4.

A method according to the invention for determining characteristics of components of a satellite communication channel comprises the following steps:

generating a first pseudo noise signal PN(t);

modulating said clean carrier signal f(t) with said first pseudo noise signal PN(t) to generate said spreaded clean carrier signal s(t);

transmitting said spreaded clean carrier signal s(t) through said communication channel at a first predetermined level;

receiving a receive signal s'(t) corresponding to said spreaded clean carrier signal s(t) after having travelled through said communication channel;

correlating said receive signal s'(t) with said first pseudo noise signal PN(t) to generate said despreaded carrier signal f'(t);

determining the group delay of the communication channel at the selected frequency of the clean carrier signal f(t) on the basis of the time delay between the first pseudo noise signal PN(t) and said receive signal s'(t); and/or determining the amplitude response of the communication channel at the selected frequency of the clean carrier signal f(t) on the basis of the correlation peak between the first pseudo noise signal PN(t) and said receive signal s'(t).

Spread spectrum modulation and demodulation is a communication technique wherein the transmitted modulation is spread (increased) in bandwidth prior to transmission over the channel and then despread (decreased) in bandwidth by the same amount at the receiver. By far the most popular spreading techniques are direct sequence (DS) modulation and frequency hopping (FH) modulation.

A direct sequence modulation is formed by linearly modulating the output sequence of a pseudo random number generator onto a chain of pulses, each having a duration called the chip time. This type of modulation is usually used with binary phase-shift-keyed (BPSK) information signals. As such the modulated signal is formed by first multiplying (modulo-2) the pure information bitstream with is the pseudo noise sequence and then modulating the phase of a clean carrier signal with the resulting signal.

At the receiver, either the PN waveform is already available or the receiver must first acquire the PN waveform. That is, the local PN random generator that generates the PN waveform at the receiver used for despreading must be aligned (synchronized) within one chip of the PN waveform of the received signal. This is accomplished by employing some sort of search algorithm which typically steps the local PN waveform sequentially in time a fraction of a chip (e.g., half a chip) and at each position searches for a high degree of correlation between the received and local PN reference waveforms. The search terminates when the correlation exceeds a given threshold, which is an indication that the alignment has been achieved. After bringing the two PN waveforms into coarse alignment, a tracking algorithm is employed to maintain fine alignment. The most popular form of tracking loops are the continuous time delay-locked loop and its time multiplexed version the tau-dither loop.

A frequency hopping modulation is formed by non-linearly modulating a chain of pulses with a sequence of pseudo randomly generated frequency shifts. This modulation signal is multiplied by a complex multiple-frequency-shift-keyed (MFSK) information signal. At the receiver, the sum of the transmitted signal and the channel interference is complex multiplied by the identical frequency hopping modulation which returns the transmitted signal to its original MFSK form. Analogous to the direct sequence case the receiver must acquire and track the frequency hopped signal so that the dehopping waveform is as close to the hopping waveform as possible.

According to one aspect of the invention said first pseudo noise signal PN(t) is a binary pseudo noise sequence. Preferably, said binary pseudo noise sequence is generated by means of a feed back shift register or a memory device in which a sequence of values of a pseudo noise signal is stored.

According to a further aspect of the invention a chiprate of said first pseudo noise signal PN(t) is less than 5 MChip/s. Preferably, said chiprate of said first pseudo noise signal PN(t) is less than or equal to 2, 5 MChip/s.

According to a further aspect of the invention said correlating of said receive signal s'(t) and said first pseudo noise signal PN(t) is achieved by delaying said first pseudo noise signal PN(t) and multiplying the delayed first pseudo noise signal PN(t) and said receive signal s'(t).

According to a further aspect of the invention the communication channel is a satellite communication channel set up by a transponder of a satellite.

According to a further aspect of the invention said first predetermined level is adjusted by a predetermined threshold below the level of a transmitted payload signal of an adjacent satellite communication channel.

In practice it has to be noted that the allocations of the frequency bands and the levels of the payload signals of adjacent satellite communication channels is well known and therefore it is possible to find an arrangement with another operator of the respective adjacent satellite communication channel in order to define the necessary threshold.

However, when determining the level for a clean carrier signal to be sent out by a ground station also the spatial separation or the spatial discrimination, respectively, of an antenna has to be considered. Thus, in a first step the allocation data of the frequency bands and the levels of the payload signals of adjacent satellites is taken as a basis for determining the given threshold. In a second step, furthermore the spatial separation characteristic both of the own ground station and the enduser terminals directed to an adjacent satellite are considered. Basically, in this situation two types of interference may happen. Either the users of an adjacent satellite receive in addition to the payload of the adjacent satellite the test signals via the enduser terminal or the own ground station also transmits a small portion of its signal to the adjacent satellite. The first type of interference is more likely to happen, as professional station normally have a much higher discrimination than enduser antennas just because of the different aperture. In this respect, the driving factor for dimensioning the measurement signal uplink power depends upon the spatial separation of both satellites and the related antenna discrimination, as well as on the level difference between the payload signal of the adjacent satellite and the measurement signal of the own satellite.

According to a further aspect of the invention said first predetermined threshold is selected preferably between 15 dB and 25 dB.

According to a further aspect of the invention a measure for said first predetermined threshold is the processing gain which is defined by the ratio of the spectrum bandwidth of the first pseudo noise signal PN(t) and the data rate of the clean carrier signal f(t), and wherein the data rate of the clean carrier signal f(t) is a result of the first predetermined threshold and the predetermined spectrum bandwidth of the first pseudo noise signal PN(t).

Hence, in accordance with this aspect of the present invention it is possible to reach almost any desired first predetermined level by selecting the date rate of the clean carrier signal f(t) accordingly.

According to a further aspect of the invention said first predetermined level of said spreaded clean carrier signal is adjusted by the following steps:
  a) setting a preliminary level which corresponds to a lower limit in the communication channel;
  b) processing said despreaded carrier signal f'(t) in order to determine actual characteristics of said despreaded carrier signal f'(t);
  c) determining the deviation between the actual characteristics and predetermined desired characteristics of said despreaded carrier signal f'(t);
  d.1) if the deviation is above a predetermined deviation: increasing the preliminary level by an incrementation parameter and repeating steps b) to d.1);
  d.2) otherwise allocate the actual preliminary level to said first predetermined level.

Hence, in accordance with this aspect of the present invention no arrangement for a first predetermined threshold is necessary. Rather the first predetermined level is adjusted by approaching a minimum level which is necessary to still receive sufficient characteristics of said despreaded carrier signal f'(t). This is done by starting at a preliminary level which is assumed to the lower limit in the communication channel and according to which no interferences with adjacent communication channels will occur.

A further aspect of the invention comprises the following steps:
  modulating a reference carrier signal $f_R(t)$ by spread spectrum modulation to generate a spreaded reference carrier signal $s_R(t)$;
  transmitting said spreaded reference carrier signal $s_R(t)$ through said communication channel at a second predetermined level;
  receiving a reference receive signal $s_R'(t)$ corresponding to said spreaded reference carrier signal $s_R(t)$ after having traveled through said communication channel;
  demodulating said reference receive signal $s_R'(t)$ by spectrum demodulation to generate a despreaded reference carrier signal $f_R'(t)$; and determining characteristics of components of the communication channel also on the basis of a comparison of said reference carrier signal $f_R(t)$ and said despreaded carrier signal $f_R'(t)$.

This aspect of the present invention considers the fact that, during measurements in a satellite communication channel, due to the movements of the satellite the distance to the satellite can change. Also, during measurements, due to atmospherical effects the attenuation of the path loss between the ground and the satellite can change. Therefore, e.g. in the case when the amplitude response and the group delay is determined by subtracting the amplitude response and the group delay at the center frequency from the respective values at other discrete frequencies, an error might occur due to the before mentioned satellite movements and atmospherical effects or other influences. These measurement errors can be compensated by the steps 13.

According to a further aspect of the invention the spread sprectrum modulation comprises the steps of
generating a second pseudo noise signal $PN_R(t)$;
modulating said reference carrier signal $f_R(t)$ with said second pseudo noise signal $PN_R(t)$ to generate said spreaded reference carrier signal $s_R(t)$.

According to a further aspect of the invention the spread spectrum demodulation comprises the steps of
correlating said reference receive signal $s_R'(t)$ with said second pseudo noise signal $PN_R(t)$ to generate said despreaded reference carrier signal $f_R'(t)$.

According to a further aspect of the invention said second predetermined level is adjusted by a second predetermined threshold below the level of a transmitted payload signal of an adjacent satellite communication channel.

According to a further aspect of the invention said second predetermined threshold is selected preferably between 15 dB and 25 dB.

According to a further aspect of the invention a measure for said second predetermined threshold is the processing gain which is defined by the ratio of the spectrum bandwidth of said second pseudo noise signal $PN_R(t)$ and the data rate of the reference carrier signal $f_R(t)$, and wherein the data rate of the reference carrier signal $f_R(t)$ is a result of the predetermined threshold and the predetermined spectrum bandwidth of the second pseudo noise signal $PN_R(t)$.

According to a further aspect of the invention said second predetermined level of said spreaded clean carrier signal is adjusted by the following steps:
a) setting a preliminary level which corresponds to a lower limit in the communication channel;
b) processing said reference receive signal $s_R'(t)$ in order to determine actual characteristics of said reference receive signal $S_R'(t)$
c) determining the deviation between the actual characteristics and predetermined desired characteristics of said reference receive signal $s_R'(t)$;
d.1) if the deviation is above a predetermined deviation: increasing the preliminary level by an incrementation parameter and repeating steps b) to d.1);
d.2) otherwise allocate the actual preliminary level to said second predetermined level.

According to a further aspect of the invention said second pseudo noise signal $PN_R(t)$ is a binary pseudo noise sequence. Preferably, said binary pseudo noise sequence is generated by means of a feed back shift register or a memory device in which a sequence of values of a pseudo noise signal is stored.

According to a further aspect of the invention said correlating of said reference receive signal $s_R'(t)$ and said second pseudo noise signal $PN_R(t)$ is achieved by delaying said second pseudo noise signal $PN_R(t)$ and multiplying the delayed second pseudo noise signal $PN_R(t)$ and said reference receive signal $s_R'(t)$.

According to a further aspect of the invention said spreaded reference signal $s_R(t)$ is transmitted through the same transponder of the satellite and said second pseudo noise signal $PN_R(t)$ is not correlated with said pseudo noise signal PN(t).

According to another aspect of the invention said spreaded reference signal $s_R(t)$ is transmitted through a different transponder of the satellite.

According to a further aspect of the invention the characteristics of the input demultiplexer (IMUX) and the output multiplexer (OMUX) in a communication satellite are determined.

Furthermore, the above-mentioned object is solved by an apparatus for determining characteristics of components of a satellite communication channel, comprising the following means:
first pseudo noise signal generating means (9) for generating a pseudo noise signal PN(t), said clean carrier signal f(t) is modulated with said first pseudo noise signal PN(t) to generate said spreaded clean carrier signal s(t);
transmitting means (11, 12, 13) for transmitting said spreaded clean carrier signal s(t) through said communication channel at a first predetermined level;
receiving means (13, 14) for receiving a receive signal s'(t) corresponding to said spreaded clean carrier signal s(t) after having travelled through said communication channel;
first correlating means (14) for correlating said receive signal s'(t) with said pseudo noise signal PN(t) to generate said despreaded carrier signal f'(t);
means for determining the group delay of the communication channel on the basis of the time delay between the first pseudo noise signal PN(t) and said receive signal s'(t); and/or
means for determining the amplitude response of the communication channel at the selected frequency of the clean carrier signal f(t) on the basis of the correlation peak between the first pseudo noise signal PN(t) and said receive signal s'(t).

According to a further aspect of the invention the first pseudo noise signal generating means (9) is designed for generating a binary pseudo noise sequence.

Preferably, said first pseudo noise signal generating means (9) is a feed back shift register or a memory device in which a sequence of values of a pseudo noise signal is stored.

According to a further aspect of the invention a chiprate of said first pseudo noise signal PN(t) is less than 5 MChip/s. Preferably, a chiprate of said first pseudo noise signal PN(t) is less than or equal to 2, 5 MChip/s.

According to a further aspect of the invention said apparatus comprises first delaying means (16) for delaying said first pseudo noise signal PN(t).

According to a further aspect of the invention the communication channel is a satellite communication channel set up by a transponder of a satellite.

According to a further aspect of the invention said first predetermined level is adjusted by a predetermined threshold below the level of a transmitted payload signal of an adjacent satellite communication channel.

According to a further aspect of the invention said first predetermined threshold is selected preferably between 15 dB and 25 dB.

According to a further aspect of the invention a measure for said first predetermined threshold is the processing gain which is defined by the ratio of the spectrum bandwidth of the first pseudo noise signal PN(t) and the data rate of the clean carrier signal f(t), and wherein the data rate of the clean carrier signal f(t) is a result of the predetermined threshold and the predetermined spectrum bandwidth of the first pseudo noise signal PN(t).

According to a further aspect of the invention said apparatus comprises the following means for adjusting said first predetermined level of said spreaded clean carrier signal:

setting means for setting a preliminary level which corresponds to a lower limit in the communication channel;

processing means for processing said despreaded carrier signal f'(t) in order to determine actual characteristics of said despreaded carrier signal f'(t) and for determining the deviation between the actual characteristics and predetermined desired characteristics of said despreaded carrier signal f'(t);

increasing means for increasing the preliminary level by an incrementation parameter if the deviation is above a predetermined deviation;

allocation means for allocating the actual preliminary level to said first predetermined level if the deviation is below or equal a predetermined deviation.

A further aspect of the invention comprises the following means:

second modulating means (18) tor modulating a reference carrier signal $f_R(t)$ by spread spectrum modulation to generate a spreaded reference carrier signal $s_R(t)$;

transmitting means (11, 12, 13) for transmitting said spreaded reference carrier signal $s_R(t)$ through said communication channel at a second predetermined level;

receiving means (13, 14) for receiving a reference receive signal $s_R'(t)$ corresponding to said spreaded reference carrier signal $s_R(t)$ after having traveled through said communication channel; and demodulating means for demodulating said reference receive signal $s_R'(t)$ by spreaded spectrum demodulation to generate a despreaded reference carrier signal $f_R'(t)$; and determining means for determining characteristics of components of the communication channel also on the basis of a comparison of said reference carrier signal $f_R(t)$ and said despreaded carrier signal $f_R'(t)$.

According to a further aspect of the invention the second modulation means comprises second pseudo noise signal generating means (17) for generating a second pseudo noise signal $PN_R(t)$, said reference carrier signal $f_R(t)$ is modulated with said second pseudo noise signal $PN_R(t)$ to generate said spreaded reference carrier signal $s_R(t)$.

According to a further aspect of the invention the demodulation means comprises second correlating means (20) for correlating said reference receive signal $s_R'(t)$ with said second pseudo noise signal $PN_R(t)$ to generate a despreaded reference carrier signal $f_R'(t)$.

According to a further aspect of the invention said second predetermined level is adjusted by a second predetermined threshold below the level of a transmitted payload signal of an adjacent satellite communication channel.

According to a further aspect of the invention said second predetermined threshold is selected preferably between 15 dB and 25 dB.

According to a further aspect of the invention a measure for said second predetermined threshold is the processing gain which is defined by the ratio of the spectrum bandwidth of said second pseudo noise signal $PN_R(t)$ and the data rate of the reference carrier signal $f_R(t)$, and wherein the data rate of the reference carrier signal $f_R(t)$ is a result of the predetermined threshold and the predetermined spectrum bandwidth of the second pseudo noise signal $PN_R(t)$.

According to a further aspect of the invention said second predetermined level of said spreaded clean carrier signal is adjusted by the following means:

setting means for setting a preliminary level which corresponds to a lower limit in the communication channel;

processing means for processing said reference receive signal $s_R'(t)$ in order to determine actual characteristics of said reference receive signal $s_R'(t)$ and for determining the deviation between the actual characteristics and predetermined desired characteristics of said reference receive signal $s_R'(t)$;

increasing means for increasing the preliminary level by an incrementation parameter if the deviation is above a predetermined deviation;

allocation means for allocating the actual preliminary level to said second predetermined level if the deviation is below or equal a predetermined deviation.

According to a further aspect of the invention the second pseudo noise signal generating means (17) is designed for generating a binary pseudo noise sequence.

Preferably, said second pseudo noise signal generating means (17) is a feed back shift register or a memory device in which a sequence of values of a pseudo noise signal is stored.

According to a further aspect of the invention said apparatus comprises second delaying means (19) for delaying said second pseudo noise signal $PN_R(t)$.

According to a further aspect of the invention said spreaded reference signal $s_R(t)$ is transmitted through the same transponder of the satellite and said second pseudo noise signal $PN_R(t)$ is not correlated with said pseudo noise signal PN(t).

According to another aspect of the invention said spreaded reference signal $s_R(t)$ is transmitted through a different transponder of the satellite.

According to a further aspect of the invention the characteristics of the input demultiplexer (IMUX) and the output multiplexer (OMUX) in a communication satellite are determined.

All in all, with the method according to the invention using spread spectrum signals, one will be able to perform measurements without creating interference to, or being interfered by channels of adjacent satellites.

If a pseudo random noise signal is used, it can be generated by feed back shift registers as described in Bernard Sklar: Digital Communications Prentice Hall 1988, for example. The is pseudo random noise signal has the important characteristic of a very sharp autocorrelation function at zero delay. This allows to regenerate exactly the time delay between a locally generated PN signal and the (delayed) received signal.

For measuring the amplitude and group delay of a communications channel, one needs to choose the chiprate (which determines the overall bandwidth of the PN signal) of the PN signal such that the modulated PN signal is narrow in comparison with the expected peaks in group delay of the communication channel. In order to be able to measure during normal operation without disturbing any payload signal, it is important that the measurement signal level is sufficiently below the level of said payload signal (e.g. about 25 dB).

Under these conditions, one can sweep the carrier of the PN signal in frequency from the lowest to the highest frequency of the communications channel, and measure the amplitude of the correlation peak and the time delay of the received and demodulated PN signal at discrete frequencies. The amplitude and time delay correspond in this case to the amplitude response and the group delay of the communications channel at the selected frequencies.

A variation of the described method for measuring the group delay consists of measuring the phase of the reconstructed carrier of the spreaded signal at a specified frequency. By measuring the phase of the reconstructed carrier of the spreaded at a frequency very close to the first frequency, it is possible to approximate the group delay at the frequency located exactly in the middle of both measurement frequencies by calculating the phase difference and dividing by the frequency difference.

Besides this conventional technique, in the present case it is possible to measure the group delay at a certain frequency directly via the delay of the despreaded carrier signal f'(t) in comparison with a pseudo noise signal PN(t) which is fed directly from the modulating means to the determining means.

For the characterization of the communications channel, the most interesting values are the amplitude response and the group delay with respect to the center frequency of the channel. This is easily obtained in subtracting the measurements at center frequency from all the measurements.

Another characteristic which can be measured by the method according to the invention is the change of the frequency of the carriers received on the uplinks to that on the downlinks (e.g. from 14 GHz to 11 Ghz).

The measurements can be performed with one measurement signal and one frequency signal, but of course the use of multiple measurement signals at different frequencies in parallel is possible, thereby increasing the measurement performance and the speed for carrying out the necessary measurements.

In the case of a satellite communication channel (a transponder), one has to face the problem that during measurement, the distance to the satellite can change due to the movements of the satellite, or that due to atmospherical effects the attenuation of the path loss between the measurement instrument and the satellite can change.

These problems can be easily solved in using a reference signal which may be located at a fixed frequency somewhere on the same transponder (or even on a neighboring transponder but on the same satellite). If the measurement signal is swept in frequency over the transponder, while the reference signal is remaining at a fixed frequency, one obtains the wanted amplitude response and group delay of the communications channel by subtracting the values of the reference signal from the measurements signal at the corresponding time.

BRIEF DESCRIPTION OF THE DRAWINGS

In the following an embodiment of the invention will be described in greater detail and with reference to the drawings.

DETAILED DESCRIPTION

Figure 1:
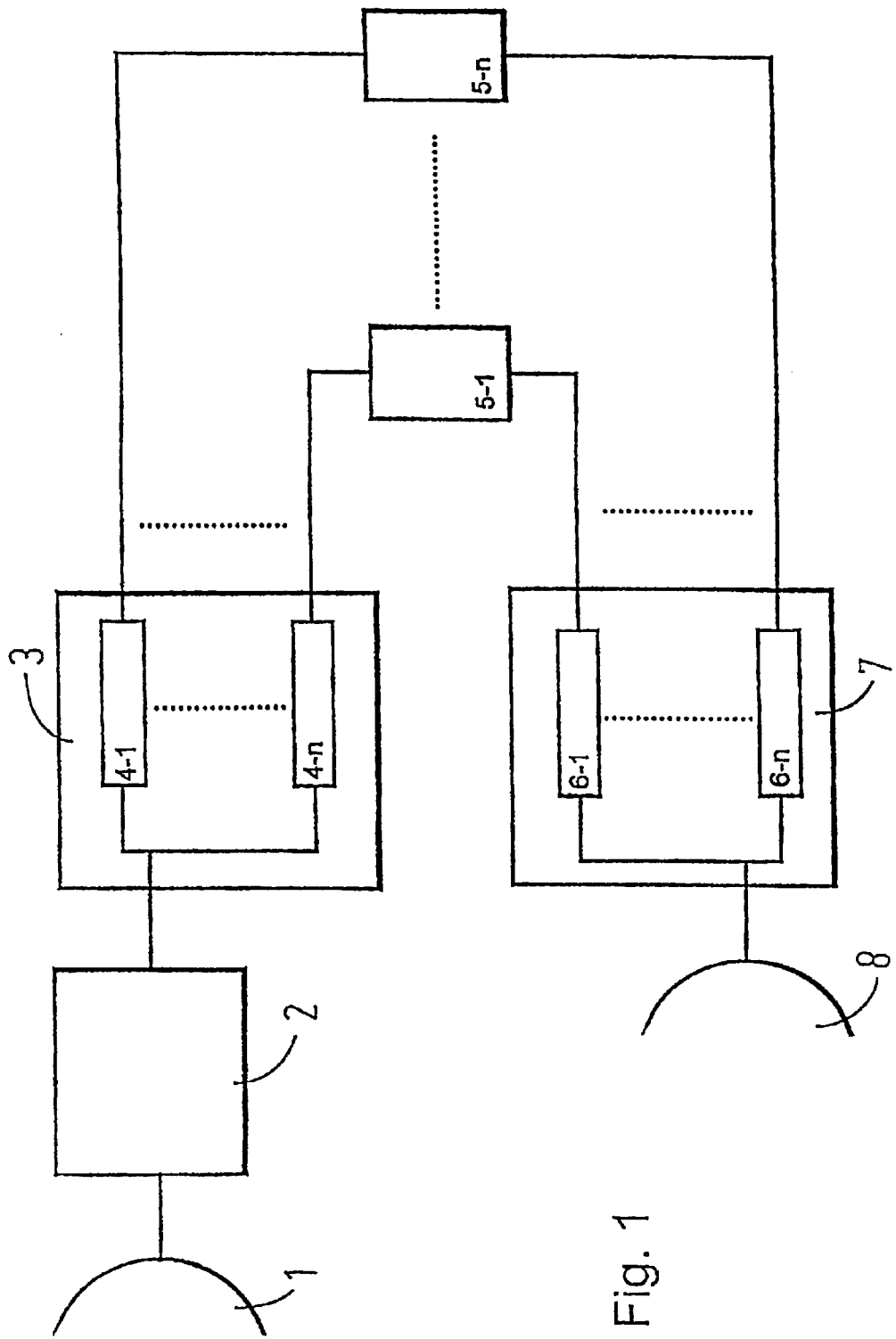
FIG. 1 shows a schematic diagram of a transponder of a communication satellite.

For the purpose of describing an embodiment of the invention, FIG. 1 shows the components of a transponder in a communication satellite as an example for a communication channel which was already explained above.

Since the filters provided in the input demultiplexer (IMUX) 3 and the output multiplexer (OMUX) 7 have a strong influence on the performance of the transponder, the method according to the invention will be explained in following with respect to measuring two specific characteristics, namely amplitude response and group delay, of these components of the transponder communication channels, the method of the invention being especially suitable for this application.

However, the same or other characteristics of other components of the communication channel can be determined by means of the method and the apparatus according to the invention.

Figure 2:
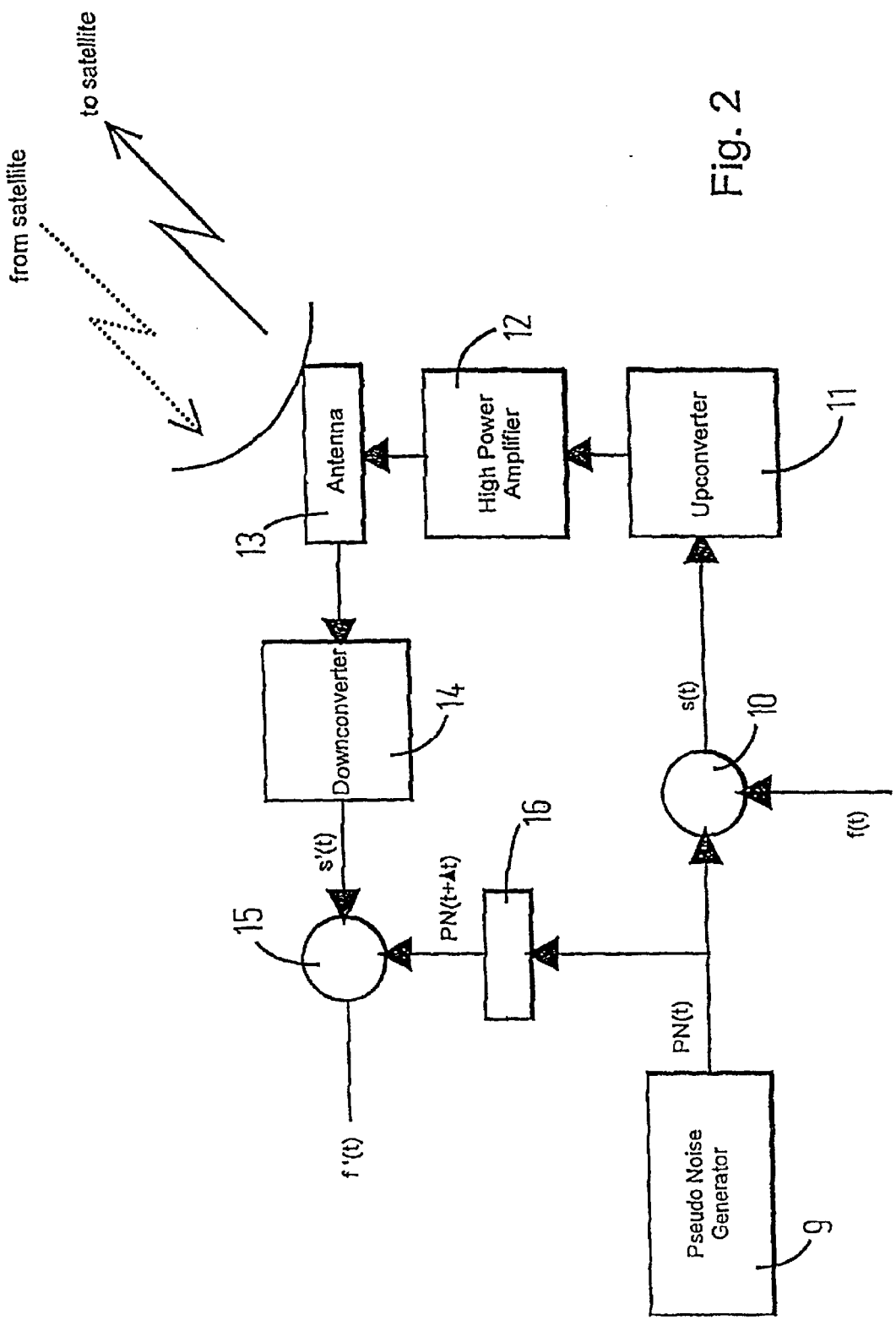
FIG. 2 shows a schematic diagram of a first embodiment of an apparatus according to the invention.

According to the invention, in a ground station as shown in FIG. 2, a pseudo noise signal PN(t) is generated by means of a pseudo noise signal generator 9, for example, a feed back shift register or a memory device in which a sequence of values of a pseudo noise signal is stored. The pseudo noise signal PN(t) has a very sharp autocorrelation function at zero delay. This allows to determine the time delay between the locally generated pseudo noise signal PN(t) and a received signal which is delayed due to the propagation time. A clean carrier signal f(t) having a variable frequency, which is varied as explained further below, is modulated with said pseudo noise signal PN(t) by means of a first multiplier 10 to form a spreaded clean carrier signal s(t)= PN(t)×f(t). The chiprate of the pseudo noise signal PN(t), which determines the bandwidth of this signal, is chosen such the bandwidth of the spreaded clean carrier signal s(t) is narrow in comparison with the expected peaks in group delay of the communication channel. Typically, the chiprate of the pseudo noise signal may be chosen less than 5 Mchip/s.

The spreaded clean carrier signal s(t) is fed to an upconverter 11 and via a high power amplifier 12 to an antenna 13 which transmits the spreaded clean carrier signal s(t) to the transponder of the communication satellite under test. However, from the viewpoint of a user transmitting a payload signal to the satellite, the transponder remains usable during the test and can be continuously supplied with a payload signal.

According to the invention, the level of the transmitted spreaded clean carrier signal s(t) is sufficiently below the level of the payload signal, for example about 15 to 25 dB or more, such that the payload signal is not notably is deteriorated. For this reason, the spreaded clean carrier signal s(t) can be transmitted while the communication channel is in use, i.e. simultaneously with a payload signal being transmitted to the transponder of the satellite from the same or from another ground station.

The frequency of the clean carrier signal f(t) is changed such that it sweeps from the lowest to the highest frequency of the pass band of the filters in the satellite transponder, or any other component of a general communication channel under test. The spreaded clean carrier signal s(t) has a narrow bandwidth due to the pseudo noise signal PN(t) such that amplitude response and group delay of the communication channel can be determined at selected discrete frequencies, as will be described in the following.

In the embodiment, antenna 13 is also used to receive the signal re-transmitted by the transponder of the satellite, in other words the signal which has traveled through the communication channel. The output signal of antenna 13 is passed through a downconverter 14 to obtain a receive signal s'(t) which is fed to a second multiplier 15 receiving also the same but delayed pseudo noise signal PN(t). The delay is generated by delaying means 16 which are set such that the output of the second multiplier 15 becomes maximum. Thereby, the receive signal s'(t) is multiplied, in other words correlated with the very same pseudo noise signal PN(t) which has been used for generating the spreaded clean carrier signal s(t) and a despreaded carrier signal f'(t) is obtained which is only delayed and attenuated in comparison with the clean carrier signal f(t). Thus, the amplitude response, which corresponds to the attenuation of the despreaded carrier signal f'(t), and the group delay, which corresponds to the delay of the despreaded carrier signal f'(t), of the transponder of the satellite, as an example of a general communication channel, can easily be determined. The runtime of a narrowband signal at its center frequency corresponds to the group delay of the filters if the phase can be linearly approximated in the signal bandwidth. The chiprate of the PN signal is determined accordingly.

As far as communication satellites are concerned, it is sufficient to determine the amplitude response and group delay over the pass band of a transponder only relative to the amplitude response and group delay at the center frequency of the pass band. Therefore, it is sufficient to delay the pseudo noise signal PN(t) such that the amplitude of the despreaded carrier signal f'(t) becomes maximal and to subtract the amplitude and the delay at the center frequency from the amplitude and the delay at any other frequency in the pass band, respectively.

Figure 3B:
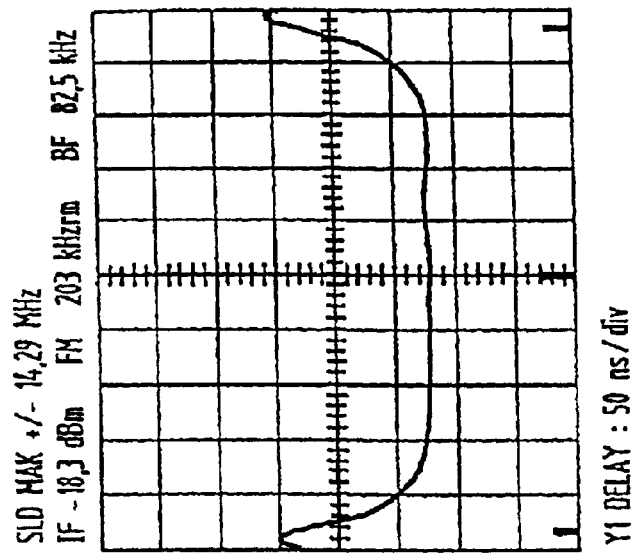
FIGS. 3a and 3b show diagrams representing measurement result.
Figure 3A:
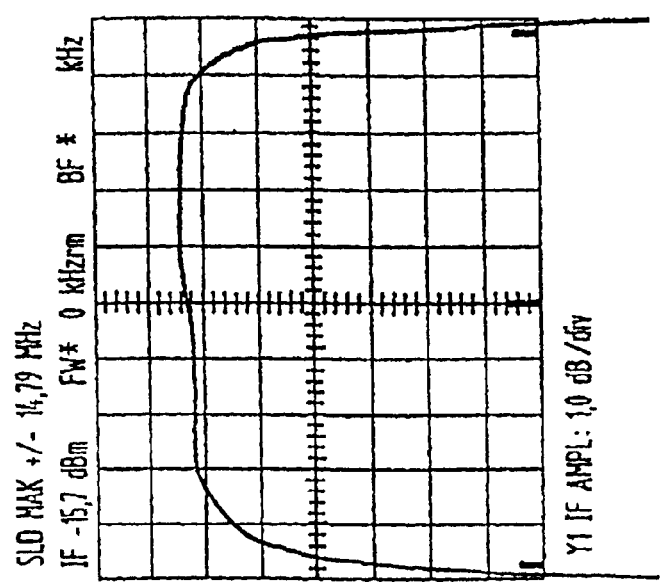

FIGS. 3a and 3b show typical measurement result for amplitude response (FIG. 3a) and group delay (FIG. 3b) as obtained by the method according to the invention.

In the case of a satellite communication channel, i.e. a transponder, it should be noted that, during measurements, due to the movements of the satellite the distance to the satellite can change. Also, during measurements, due to atmospherical effects the attenuation of the path loss between the ground station and the satellite can change. Since in the above embodiment the amplitude response and the group delay is determined by subtracting the amplitude response and the group delay at the center frequency from the respective values at other discrete frequencies, an error might occur due to the before mentioned satellite movements and atmospherical effects or other influences.

Figure 4:
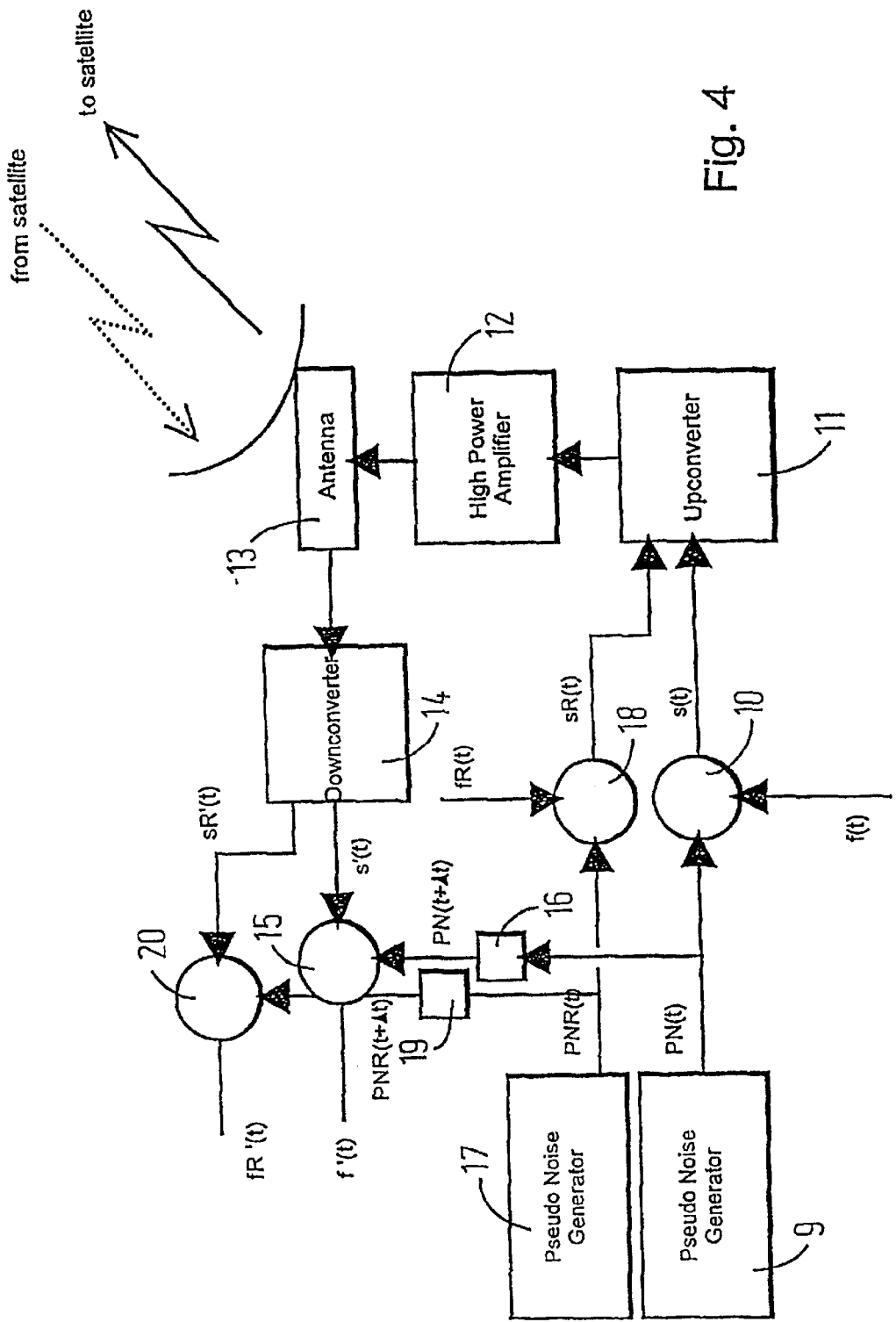
FIG. 4 shows a schematic diagram of a second embodiment of an apparatus according to the invention.

As shown in FIG. 4, a reference signal $s_R(t)$ can be used to compensate the before mentioned measurement error. In FIG. 4 the same reference signs are used for those parts already described above and reference is made to the above description of these parts. The reference signal $s_R(t)$ is generated by means of a third multiplier 18 which receives a second pseudo noise signal $PN_R(t)$, which is not correlated with the first pseudo noise signal PN(t) and which is generated by a second pseudo noise generator 17, and a reference carrier signal $f_R(t)$ which may be located at a fixed frequency somewhere within the pass band of the same transponder or in the pass band of another transponder on the same satellite having a different center frequency. Like in the above embodiment, a spreaded reference carrier signal $s_R(t)$ is transmitted to the satellite and the reference receive signal $s_R'(t)$ is multiplied with the second pseudo noise signal $PN_R(t)$ to obtain the despreaded reference signal $f_R'(t)$. While the measurement signal is swept in frequency over the transponder pass band, the frequency of the reference carrier signal $f_R(t)$ remains at a fixed frequency. Therefore, a corrected amplitude response and group delay of the communications channel can be obtained by subtracting the values of the reference signal from the values of the measurement signals at the respective time.

A variation of the described measuring the group delay consists of measuring the phase of the reconstructed carrier of the spreaded signal at a specified frequency very close to the first frequency, it is possible to approximate the group delay at the frequency located in the middle of both measurement frequencies by calculating the phase difference and dividing by the frequency difference.

Only pseudo noise signals have been discussed above because these signals can be generated comparatively easily. However, true noise signals can be used in the method and the apparatus according to the invention. Properties of true and pseudo noise signals are well known to those skilled in the art and are described, for example in Bernard Sklar, "Digital Communications—Fundamentals and Applications", Prentice Hall, 1988.

Figure 5:
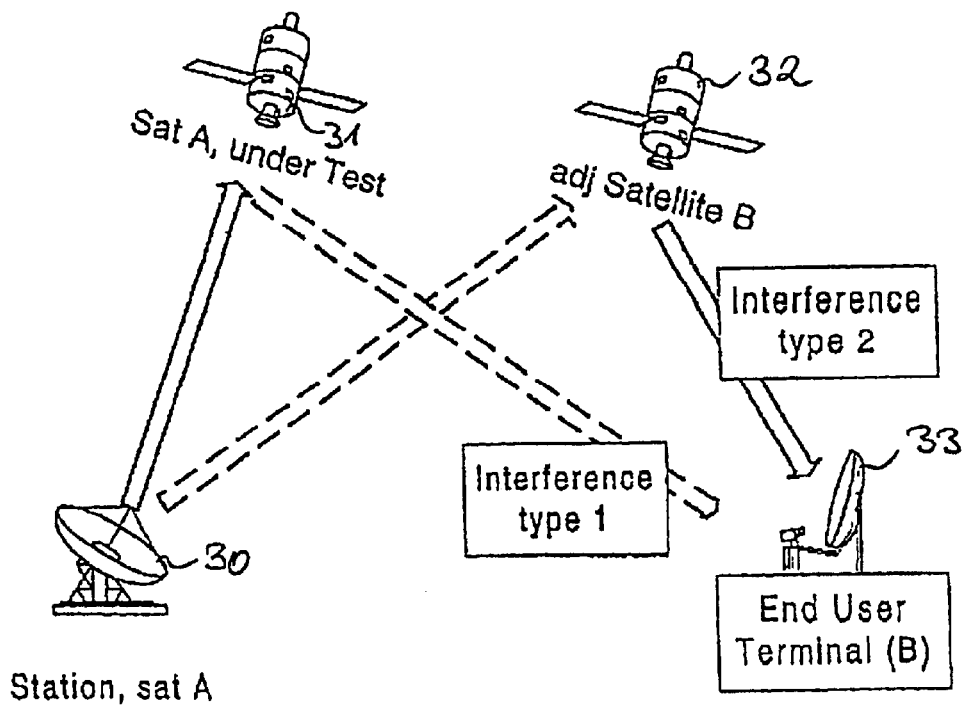
FIG. 5 shows a schematic diagram to illustrate the situation of possible interference types.

FIG. 5 shows a schematic diagram to illustrate the situation of possible interference types. FIG. 5 assumes the situation when a satellite 31 was just launched and is now subject of various types of tests in its beginning of life phase. The is responsible station for carrying out these tests is the ground station 30. While carrying out these tests it has to be ensured that the communication channels of adjacent satellites are not affected. Thus, satellite 32 represents possible adjacent satellites which could be affected by the measurements carried out for satellite 31. Signals sent out by satellite 32 are received by a plurality of enduser terminals which are represented by the enduser terminal 33.

Basically, two types of interference from the measurement signals on satellite 31 to satellite 32 and the corresponding enduser terminals 33 may happen: Either the users of satellite 32 receive through their (small) dish the measurement signal directly via satellite 31, i.e. in addition to the payload signal of satellite 32, or the station 30 transmits also a small portion of its signal to the adjacent satellite 32. The first type of interference is more likely to happen, as professional stations normally have a much higher discrimination than enduser antennas just because of the different size of the aperture. In this respect, the driving factor for dimensioning the measurement signal uplink power depends upon the spatial separation of both satellites and the related antenna discrimination, as well as on the level difference between payload signal B and the measurement signal A.

It has to be noted, that the invention also allows to carry out the necessary measurements with an antenna having a smaller aperture than a conventional antenna of the own earth station 30. Due to the decreased spatial separation of a smaller type of antenna the interference type 2 might occur. However, this is not critical as long as the spread clean carrier signal s(t) is received by an end user terminal 33 of a communication channel of satellite 32 with a level which is under the level of a received payload signal of said communication channel by a predetermined threshold.

What is claimed:

1. Method for determining characteristics of components of a satellite communication channel, comprising:

generating a first pseudo noise signal PN(t);

modulating a clean carrier signal f(t) with said first pseudo noise signal PN(t) to generate a spreaded clean carrier signal s(t);

transmitting said spreaded clean carrier signal s(t) through said communication channel at a first predetermined level;

receiving a receive signal s'(t) corresponding to said spreaded clean carrier signal s(t) after having travelled through said communication channel;

correlating said receive signal s'(t) with said first pseudo noise signal PN(t) to generate said despreaded carrier signal f'(t);

determining the group delay of the communication channel at the selected frequency of the clean carrier signal f(t) on the basis of the time delay between the first pseudo noise signal PN(t) and said receive signal s'(t);

determining the amplitude response of the communication channel at the selected frequency of the clean carrier signal f(t) on the basis of the correlation peak between the first pseudo noise signal PN(t) and said receive signal s'(t).

2. Method according to claim 1, wherein said first predetermined level is adjusted by a predetermined threshold below the level of a transmitted payload signal of an adjacent satellite communication channel.

3. Method according to claim 1, wherein said first predetermined level of said spreaded clean carrier signal s(t) is adjusted by the following steps:

a) setting a preliminary level which corresponds to a lower limit in the communication channel;

b) processing said despreaded carrier signal f'(t) in order to determine actual characteristics of said despreaded carrier signal f'(t)

c) determining the deviation between the actual characteristics and predetermined desired characteristics of said despreaded carrier signal f'(t), d. 1) if the deviation is above a predetermined deviation: increasing the preliminary level by an incrementation parameter and repeating steps b) to d. 1;

d.2) otherwise allocate the actual preliminary level to said first predetermined level.

4. Apparatus for determining characteristics of components of a satellite communication channel, comprising:

first pseudo noise signal generating means (9) for generating a pseudo noise signal PN(t), a clean carrier signal f(t) is modulated with said first pseudo noise signal PN(t) to generate a spreaded clean carrier signal s(t);

transmitting means (11, 12, 13) for transmitting said spreaded clean carrier signal s(t) through said communication channel at a first predetermined level;

receiving means (13, 14) for receiving a receive signal s'(t) corresponding to said spreaded clean carrier signal s(t) after having travelled through said communication channel;

first correlating means (14) for correlating said receive signal s'(t) with said pseudo noise signal PN(t) to generate said despreaded carrier signal f'(t);

means for determining the group delay of the communication channel on the basis of the time delay between the first pseudo noise signal PN(t) and said receive signal s'(t); and means for determining the amplitude response of the communication channel at the selected frequency of the clean carrier signal f(t) on the basis of the correlation peak between the first pseudo noise signal PN(t) and said receive signal s'(t).

5. Apparatus according to claim 4, wherein said first predetermined level is adjusted by a predetermined threshold below the level of a transmitted payload signal of an adjacent satellite communication channel.

6. Apparatus according to claim 4, further comprising for adjusting said first predetermined level of said spreaded clean carrier signal:

setting means for setting a preliminary level which corresponds to a lower limit in the communication channel;

processing means for processing said despreaded carrier signal f'(t) in order to determine actual characteristics of said despreaded carrier signal f'(t) and for determining the deviation between the actual characteristics and predetermined desired characteristics of said despreaded carrier signal f'(t);

increasing means for increasing the preliminary level by an incrementation parameter if the deviation is above a predetermined deviation;

allocation means for allocating the actual preliminary level to said first predetermined level if the deviation is below or equal a predetermined deviation.

* * * * *